May 18, 1965 B. O. WEINSCHEL 3,184,694
PRECISION VARIABLE COAXIAL ATTENUATOR
Filed May 20, 1963 3 Sheets-Sheet 1

INVENTOR
Bruno O. Weinschel
BY *Max L. Libman*
ATTORNEY

May 18, 1965  B. O. WEINSCHEL  3,184,694
PRECISION VARIABLE COAXIAL ATTENUATOR
Filed May 20, 1963  3 Sheets-Sheet 2

INVENTOR
Bruno O. Weinschel

BY  *Max L. Libman*

ATTORNEY

May 18, 1965  B. O. WEINSCHEL  3,184,694
PRECISION VARIABLE COAXIAL ATTENUATOR
Filed May 20, 1963  3 Sheets-Sheet 3

INVENTOR
Bruno O. Weinschel

BY  Max L. Libman
ATTORNEY

United States Patent Office 3,184,694
Patented May 18, 1965

3,184,694
PRECISION VARIABLE COAXIAL ATTENUATOR
Bruno O. Weinschel, Bethesda, Md., assignor to Weinschel Engineering Co., Inc., Gaithersburg, Md., a corporation of Delaware
Filed May 20, 1963, Ser. No. 281,576
3 Claims. (Cl. 333—81)

This invention relates to precision attenuators for use in high frequency coaxial lines, and has for its primary object the provision of a continuously variable, rugged, highly accurate T-pad microwave attenuator for use primarily in making precision measurements over a wide frequency range, from D.-C. to the order of 1,000 megacycles and higher.

It is relatively easy to make a T-pad attenuator for use over a limited range of either attenuation value or frequency, but practical requirements indicate a need for use with precision microwave measuring equipment, of a continuously variable precision attenuator capable of use in coaxial line circuits over an extremely wide range of frequencies, with direct dial reading over a uniform linear scale, and with high accuracy at all points on the scale, and at all values of frequency. A T-pad resistance attenuator is particularly useful for this purpose, but many practical difficulties arise in the construction of such an attenuator having all of the desired qualities enumerated above. The relationship between series and shunt resistors in a T-pad attenuator is not linear with length along the resistance element. In order to make the dial calibration linear, it is necessary to adjust the resistance characteristic of these elements along their length so as to compensate for this effect. A second problem in an attenuator of this type results from the fact that it is essentially a strip line unit which must be coupled to a coaxial line. It is therefore necessary to provide a reasonable impedance match and to prevent a high degree of reflection at the coupling point.

It is a major object of the present invention to solve the above problems, which has been accomplished by means of the construction described below, together with the use of tapered connections on the strip line at its terminal points, together with other features including the use of solid conductive contact furnished by sliding brushes, and by adjusting the variation of resistance with length along the resistive elements, so as to provide a unit having substantially the same attenuation value over a very high frequency range from D.-C. to 1,000 megacycles or higher. This is particularly useful in modern practice because it is desirable, for calibration purposes, to be able to make calibrating or checking measurements in the D.-C. or low frequency A.-C. range, while it is, of course, important that reading so made should also be reliable at microwave frequencies.

The specific nature of the invention, as well as other objects and advantages thereof, will clearly appear from a description of a preferred embodiment as shown in the accompanying drawings, in which.

Figure 1:
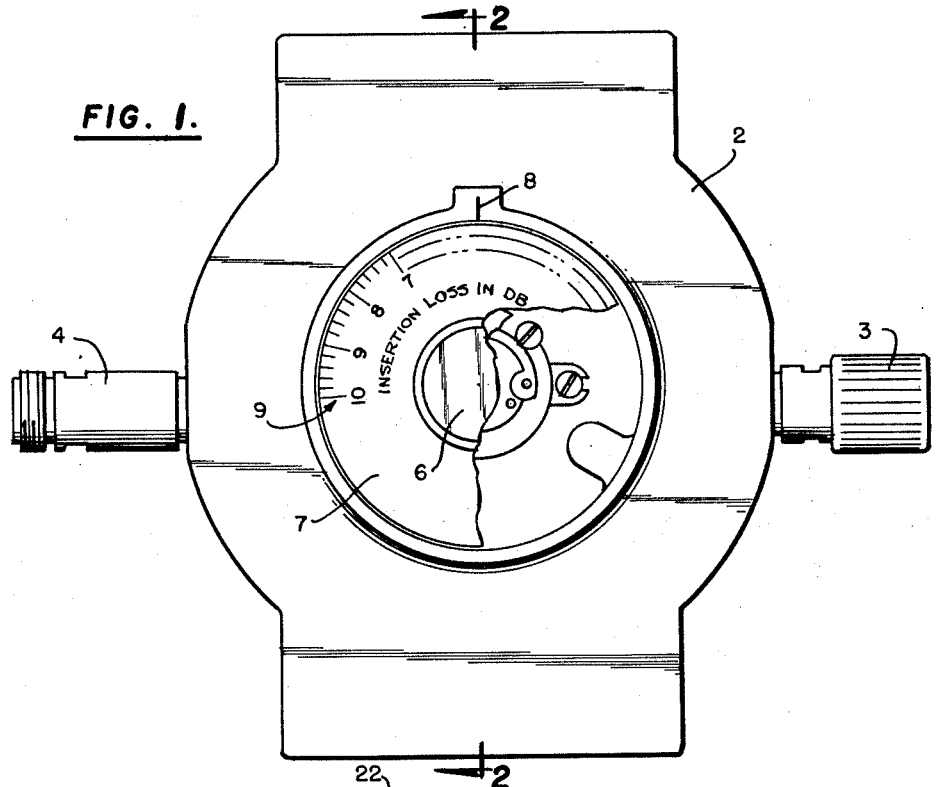
FIG. 1 is a front view of an attenuator according to the invention, partly broken away.
Figure 2:
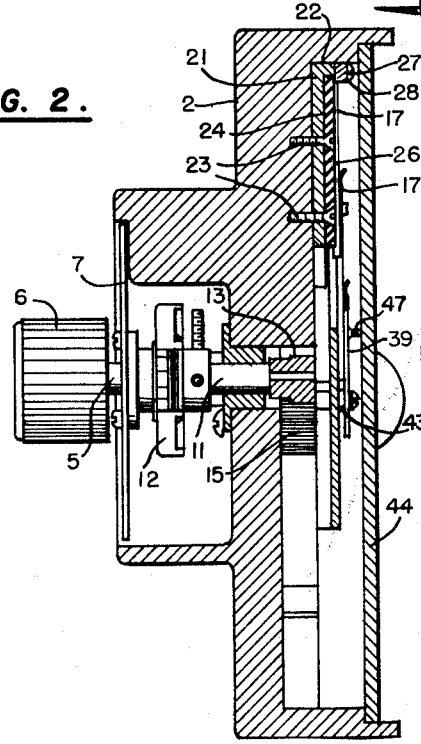
FIG. 2 is a sectional view taken on line 2—2 of FIG. 1.

Referring to FIGS. 1 and 2, the attenuator is encased in a rugged metallic housing 2 which is grounded by virtue of its metallic connection to conventional female and male coaxial connectors 3 and 4 respectively. A knob 6 is mounted on shaft 5, which extends through the casing, for adjusting the attenuator. Shaft 5 has a scale 7 fixed to it for cooperation with a fixed reference point 8 to indicate the setting of the attenuator. The dial is calibrated as shown at 9, with a db scale which is substantially uniform over most of its range, although it is preferably somewhat compressed toward both extreme ends of the scale. The scale calibrations indicate directly the insertion loss in db.

Referring to FIG. 2, shaft 5 is connected to shaft 11, preferably through a reduction gearing 12, of conventional construction, or any similar arrangement may be used whereby the motion of the knob produces a smaller motion of shaft 11, in order to provide a very fine manual adjustment. Shaft 11 is fixed to pinion gear 13, so that rotation of knob 6 by hand produces a much smaller but proportional rotation of gear 13. Rotation of gear 13 causes corresponding linear movement of rack 15 (FIG. 3) which is meshed with gear 13, and which is constrained for linear movement by channel 16 cut into the casing 2 of the device. As will be shown below, this linear movement controls the adjustment of the resistive elements of the T-pad, the circuitry of which will now be described.

Figures 4, 4A:
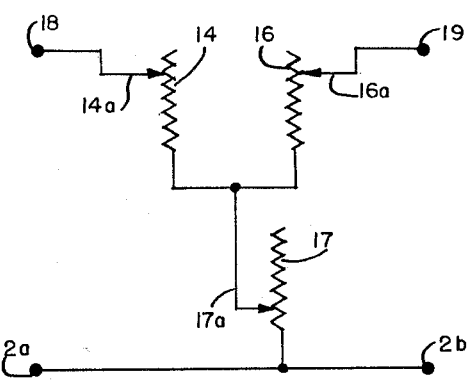
FIGS. 4, 4A and 4B are circuit diagrams used in explaining the operation of the attenuator.

Referring to FIG. 4, the T-pad comprises three simultaneously adjustable resistance elements 14, 16 and 17 connected between the "hot" terminals 18 and 19 which are included in the center-line circuit of a coaxial system, and the terminals 2a, 2b, which are connected to the grounded outer conductor of the coaxial system. Identical resistors 14 and 16 are in series with the center conductor of the circuit, while shunt resistor 17 extends from the common point of the two series resistors to the ground conductor. Each of these resistors is variable, and in operating them as a variable attenuator, their adjustable contact points 14a, 16a and 17a respectively must be moved simultaneously by a single control. A definite relationship must exist between the values of all three resistors and any setting of the control element which adjusts the contact points, as is well known.

In order to achieve such values, and at the same time have a substantially linear dial scale relationship, it is desirable that the width of the resistor strips should vary suitably along their respective lengths, i.e., the resistance strips must be tapered, as will be explained below.

Figure 4B:
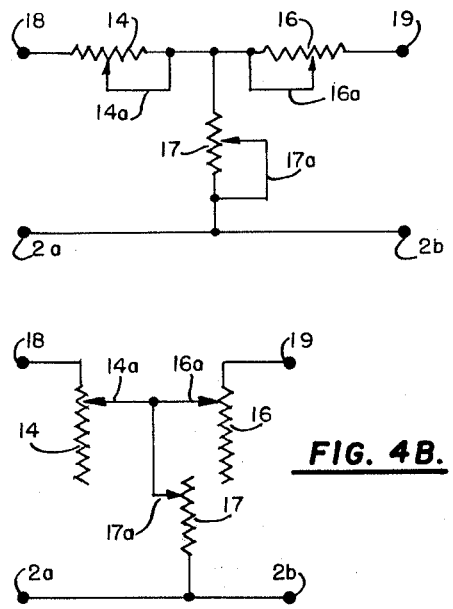

FIGS. 4A and 4B show alternative forms of variable T-pads which are electrically equivalent to FIG. 4.

For successful use over a wide range of frequencies including the high microwave range, it is necessary to minimize capacitive and inductive effects, which vary with the frequency, and it is also necessary to provide good impedance matching in order to eliminate undesired reflective effects. This is provided by the detailed construction which will now be explained.

A narrow metallic support member 21 (FIG. 2) having a small angular projection 22 at one end is firmly and conductively held in mechanical and electrical contact with casing 2 by means of screws 23 made of a high grade insulating material such as nylon or Teflon. Screws 23 actually engage insulating sheet 24, also made of a high grade insulating material, thus holding the assembly of 24 and 21 in place. A thin sheet of high grade ceramic material 26 lies on top of sheet 24 and is held in place by conductive block 27 and screws 28. A very thin layer of resistive material 17 is deposited on the upper surface of ceramic sheet 26, and constitutes the resistive element 17 shown in FIG. 4. This thin layer of resistive material is extended to and in good electrical contact with metal member 27, and so is grounded at one end to the casing 2. The effective electrical length, and hence the resistance, of member 17 is determined by the position of contact fingers 17a, which is determined by the position of rack 14, as will be shown below.

Figure 3:
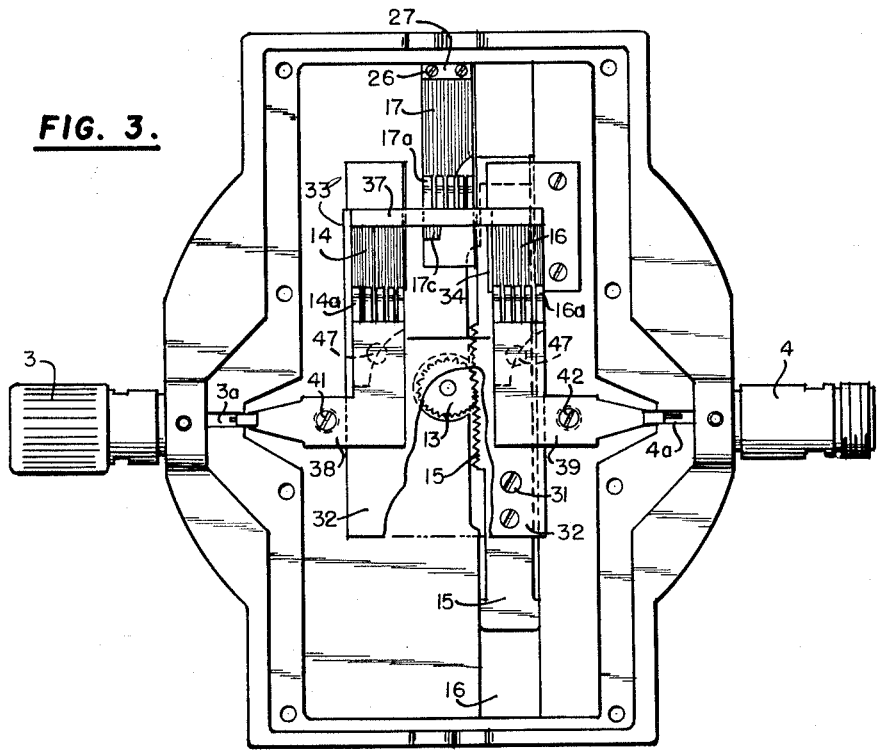
FIG. 3 is a back view, partly broken away, of the attenuator with the back cover plate removed.

As can be seen in FIG. 3, the ungrounded end of resistive strip 17 is tapered in width, in order to provide a desired resistance relationship with length as the spring fingers 17a are moved downwardly in FIG. 3. The correct taper for a linear scale relationship can be calculated, as will be shown below.

Figure 7:
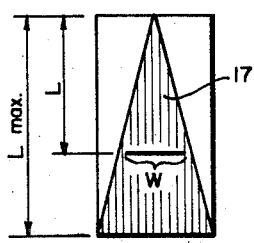
FIGS. 7, 8 and 9 are graphic drawings used in explaining and developing the theory of scale linearity employed in the attenuator.

Referring to FIG. 7, the general shape of resistive layer 17 is indicated as tapering from the base, where the attenuation ($\alpha$) at a horizontal line of contact is a maximum, to the tip, where the attenuation is a minimum. The sloping sides are shown straight merely to indicate the general direction of taper; actually, these sides are curves which are to be determined. $L_{max}$ is the maximum travel of the contact brushes.

It is desired to calculate the width $w$, representing the line of contact, as a function of the length L.

(1) $$w = f(L)$$

Considering a differential step along L, the differential of the resistance R will be (2) $$dR = \sigma \frac{dL}{w(L)}$$

where $\sigma$ is the surface resistance in ohms per square.

For a T-pad, the shunt resistor $R_2$ (element 17 of FIG. 4) will be (3) $$R_2 = \frac{Z}{\sinh \alpha}$$

where Z is the characteristic impedance and $\alpha$, as above, is the attenuation in nepers.

Since we wish the attenuation to change linearly with changes in length L, (4) $$\alpha = c_1 L + c_2$$

(5) for $L = L_{max}$, $\alpha = \alpha_{max}$, and $c_1 = \frac{\alpha_{max}}{L_{max}}$ (6) for $L = 0$, $\alpha = 0$, and $c_2 = 0$ (7) $$\therefore \alpha = cL = \frac{\alpha_{max}}{L_{max}} L, \text{ and } c = \frac{\alpha_{max}}{L_{max}}$$

Substituting Equation 7 into Equation 3:

(8) $$R_2 = \frac{Z}{\sinh cL}$$

Differentiating 8:

(9) $$\frac{dR_2}{dL} = \frac{-cZ \cosh cL}{\sinh^2 cL}$$

From Equation 2, we have

(10) $$\frac{dR_2}{dL} = \frac{-\sigma}{w(L)}$$

Combining (9) and (10) and substituting $\cosh^2 u - \sinh^2 u = 1$,

(11) $$\frac{dR}{dL} = \frac{-\sigma}{w(L)} = \frac{cZ \cosh cL}{(1 - \cosh^2 cL)}$$

$$= \frac{cZ}{\frac{1}{\cosh cL} - \cosh cL}$$

(12) $$w(L) = -\frac{\sigma}{cZ} \left( \frac{1}{\cosh cL} - \cosh cL \right)$$

In order to arrive at practical numerical values, we may assume:

$Z = 50$ ohms $\sigma = 50$ ohms per square $\alpha_{max} = 10$ db $\doteq 1.15$ nepers $L_{max} = 1''$ $c = \frac{\alpha_{max}}{L_{max}} = \frac{1.15}{1}$ nepers per inch

(13) $$\frac{\sigma}{cZ} = \frac{50}{50(1.15)} = 0.87$$

Figure 8:
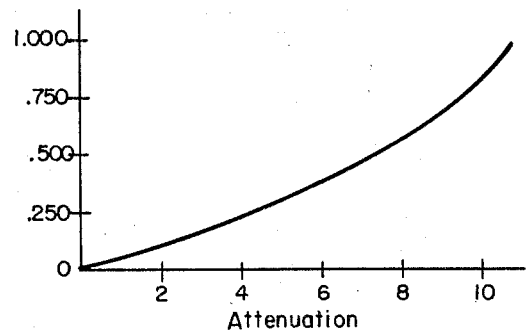
Figure 9:
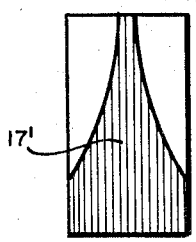

From this a curve can be readily plotted for uniformly increasing values of attenuation, which will have the general character shown in FIG. 8, assuming one side straight, as shown at 17 in FIG. 2. This can readily be transformed into a symmetrical taper as shown in FIG. 7, if desired. In practice, the taper can not be brought to a point because the width along the line of contact diminishes to an impractical degree, but a compromise must be made by leaving a reasonable width at the tip, which still provides a useful approximation to the ideal configuration.

The calculation for the series resistor will follow the same line as above, and give the result:

(14) $$\frac{\sigma}{w(L)} = \frac{cZ}{Z} \left( \frac{1}{\cosh^2 \frac{cL}{Z}} \right)$$

(15) $$w(L) = \frac{Z\sigma}{cZ} \cdot \cosh^2 \frac{cL}{Z}$$

from which the series resistance taper can be similarly computed.

Figure 5:
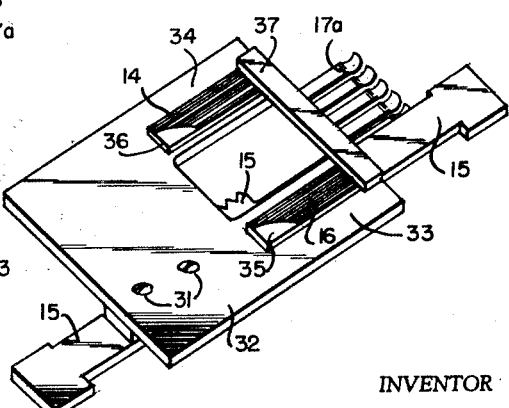
FIG. 5 is a perspective view of the rack and resistance plate of the attenuator.

Attached to rack 15, suitably by means of nylon screws 31, is a sheet of rigid high grade insulating material 32 (FIGS. 3 and 5). Sheet 32 is provided with two projecting arms 33 and 34, leaving a space between them for the accommodation of resistance element 17 and its supporting assembly. On the upper surface of each of these arms is a thin sheet of high grade ceramic material 35 and 36 respectively, and deposited on the upper surface of these sheets are thin resistive layers 14 and 16 respectively, constituting the two series resistance elements shown in FIG. 4. A rigid conductive bar 37 extends across the free ends of arms 33 and 34, in good electrical and mechanical contact with both the arms and the resistive coating 14 and 16. Spring contact fingers 17a are electrically and mechanically connected to bar 37, and hence are carried therewith in accordance with the movement of rack 15.

The center conductors 3a and 4a (FIG. 3) of coaxial connectors 3 and 4 respectively are respectively connected to rigid metal striplines 38 and 39, which are tapered toward the points of connection to minimize reflection losses, and are thin flat conducting strips in the shape of right angles, of considerable rigidity and mechanical strength. They are supported by insulating screws 41 and 42 respectively, and insulating collars, one of which is shown in FIG. 2 at 43, to provide stand-off or space clearance from the casing 2 by which they are supported. Conductors 38 and 39 bear spring contact fingers 14a and 16a at their free ends, being the same adjustable contact points as shown in FIG. 4A. A metal cover 44 is screwed or otherwise fastened to the open end of the casing to complete the assembly. The cover is preferably provided with two downwardly extending lugs 47 of insulating material, which may be plastic screws, which serve to provide downward pressure on the free ends of strip conductors 38 and 39 respectively, to insure adequate contact pressure at 14a and 16a.

The attenuator is adjusted by rotating knob 6, which, as above explained, causes the linear movement of rack 15. This rack carries resistive elements 14 and 16, which are thus moved relative to stationary spring contacts 14a and 16a to adjust the effective value of the series resistors 14 and 16. At the same time, bar 37 carries spring contact 17a along resistive element 17, the effective length of which is thus changed in the opposite direction from the change in elements 14 and 16. In other words, as the resistance of elements 14 and 16 is increased, the resistance of element 17 is simultaneously and correspondingly decreased, which is the desired relationship. By employing stripline construction of both the conductors 38 and 39 and of the resistive elements 14, 17 and 16, all of which are in substantially the same plane, capacitive effects are reduced to a minimum, since only the very thin edges of the conductors are opposed to each other. The thin resistive films are made in accordance with any of a number of known methods, this art being now well developed, so that the construction of the resistance film is not a part of the present invention.

Attenuators in accordance with the above principles are made which are useful over a frequency range extending from D.-C. to over 1,000 megacycles, continuously variable to 10 db, having an accuracy of calibration at D.-C. of + or −0.06 db and at R-F of + or −0.15 db, with a VSWR of 1.25 maximum up to 500 mc. and of 1.50 from 500 mc. to 1 gc. This high performance, coupled with low insertion loss, is achieved by the principles of the invention.

Figure 6:
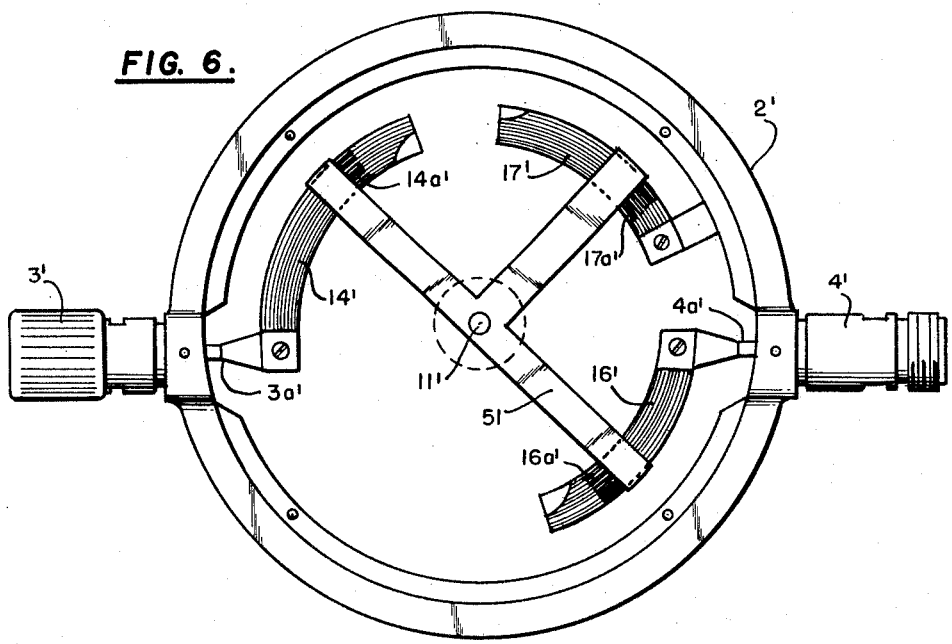
FIG. 6 is a back view, with the cover plate removed, of a modified form of the attenuator.

FIG. 6 shows a modified form of the invention, in which, instead of using linear motion, rotary motion is employed. Shaft 11' corresponds to shaft 11 of FIG. 2, and may be rotated by a knob similar to knob 6 of FIG. 2 through a reduction gearing as there shown. The shaft carries a T-shaped wiper arm 51 bearing spring contacts 14a', 16a', and 17a', corresponding to the similarly numbered elements of FIG. 3, with primes added. Resistors 14', 16', and 17' correspond again to similarly numbered elements in FIG. 3, and it will be seen that as the shaft 11' is rotated, the series elements 14', 16' are varied in the opposite sense from the shunt element 17', as was previously the case. It will also be apparent that the resistive elements, or any of them, could be carried by the movable arm 51, while the spring contacts could be connected to the stationary parts of the device.

It will be apparent that the embodiments shown are only exemplary and that various modifications can be made in construction and arrangement wtihin the scope of my invention as defined in the appended claims.

I claim:

1. A high frequency variable T-pad attenuator for a wide range of frequencies from D.-C. to the gc. range, comprising
   (a) input and output coaxial cable connector means each having a central inner conductor and an outer ground conductor coaxial therewith and insulated therefrom;
   (b) a conductive casing to which the outer ground conductors of said connector means are mechanically and electrically connected;
   (c) two variable resistor elements within said casing, connected in series between the central conductors of said connector means;
   (d) a variable shunt resistor element within said casing, connected between the common series connection of said two series of resistor elements and said conductive casing;
   (e) a single control means for simultaneously increasing the resistance value of each of said series resistors and decreasing the value of said shunt resistor, and vice versa;
   (f) each of said resistors being thin film resistors lying substantially in a common plane;
   (g) a microwave stripline between each of said central conductors and one of said series resistors, each said stripline lying substantially in said common plane, and having a tapered connection to its associated conductor;
   (h) said control means comprising manually settable means having scale reference means for indicating the setting position thereof, a movable mechanical support member driven in a fixed path by said manually settable means, and means carried by said support means for varying the setting of said series resistors and said shunt resistor as the support means is moved in said fixed path;
   (i) and drive means between said control means and said mechanical support means comprising a rack and pinion for moving said support means in a straight line; and spring-biased contact finger means respectively supported by and in electrical contact with each of said striplines, said series resistors being carried by said mechanical support means for motion therewith relative to said contact means and each in contact with its respective contact means.

2. The invention according to claim 1, said shunt resistor being supported by said casing and fixed relative thereto, and further contact means carried by said mechanical support means in electrical engagement with said shunt resistor and movable with said support means to vary the value of shunt resistance as the value of series resistance is varied.

3. The invention according to claim 2, said shunt resistor tapering at its free end according to the relationship $$w(L) = -\frac{\sigma}{cZ}\left(\frac{1}{\cosh cL} - \cosh cL\right)$$

and the series resistors tapering at their free ends according to the relationship $$w(L) = \frac{2\sigma}{cZ}\cosh^2\frac{cL}{2}$$

where $w$ = width of contact area,
$L$ = length,
$\sigma$ = surface of resistance,
$Z$ = impedance,
$c$ = constant.

References Cited by the Examiner

UNITED STATES PATENTS

| 2,515,228 | 7/50 | Hupcey | 333—81 |
| 2,901,709 | 8/59 | Fitzmorris | 333—84 |
| 3,002,165 | 9/61 | Ayer et al. | 333—81 |
| 3,013,227 | 12/61 | Jordan | 333—84 |

OTHER REFERENCES

Reference Data for Radio Engineers, International Telephone and Telegraph Corporation, fourth edition, copyright 1956, pages 255–256 relied on.

HERMAN KARL SAALBACH, *Primary Examiner.*